US009043221B1

(12) United States Patent
Vaughan, Jr. et al.

(10) Patent No.: US 9,043,221 B1
(45) Date of Patent: *May 26, 2015

(54) METHOD AND APPARATUS FOR PROCESSING AGRICULTURAL MATERIALS AND CHANGING THE PROPORTIONS OF OUTPUT MATERIALS

(76) Inventors: John Thomas Vaughan, Jr., Stillwater, MN (US); William Charles Neely, Auburn, AL (US); Bruce J. Rader, Plymouth, MN (US)

(*) Notice: Subject to any disclaimer, the term of this patent is extended or adjusted under 35 U.S.C. 154(b) by 284 days.

This patent is subject to a terminal disclaimer.

(21) Appl. No.: 13/461,756

(22) Filed: May 1, 2012

Related U.S. Application Data

(62) Division of application No. 11/837,493, filed on Aug. 10, 2007, now Pat. No. 8,170,908.

(60) Provisional application No. 60/822,043, filed on Aug. 10, 2006, provisional application No. 60/824,523, filed on Sep. 5, 2006.

(51) Int. Cl.
*G06Q 99/00* (2006.01)
*G06Q 10/10* (2012.01)

(52) U.S. Cl.
CPC .................................. *G06Q 10/101* (2013.01)

(58) Field of Classification Search
CPC ........ G06Q 10/00; G06Q 10/101; A01K 5/02
USPC .................. 705/300; 703/6, 11, 22
See application file for complete search history.

(56) References Cited

U.S. PATENT DOCUMENTS

| 4,260,573 A | 4/1981 | Overman |
| 5,215,135 A | 6/1993 | Coakley et al. |

(Continued)

FOREIGN PATENT DOCUMENTS

WO WO 2010034023 A1 3/2010

OTHER PUBLICATIONS

S. Mani, S. Sokhansanj, X. Bi, A. Turhollow; "Economics of Producing Fuel Pellets From Biomass", Mar. 2006, Applied Engineering in Agriculture, vol. 22(3): pp. 421-426.*

(Continued)

*Primary Examiner* — Shannon Campbell
*Assistant Examiner* — Freda A Nelson
(74) *Attorney, Agent, or Firm* — Charles A. Lemaire; Jonathan M. Rixen; Lemaire Patent Law Firm, P.L.L.C.

(57) ABSTRACT

Apparatus and method for optimizing different amounts of output products derived from an initial biomass material. The method includes obtaining economic data of costs and availability of raw materials and resources, and prices that would be paid for output products derived, performing calculations to determine an optimum amount of each of the output products; and controlling processes that generate the output products. In some embodiments, the processes convert initial biomass materials into intermediate and output products, an economic engine that obtains economic data relating to costs of initial materials and prices that would be paid for output products derived from the raw materials, and performs calculations to determine an optimum amount of each of the output products, and valves that are controlled by the economic engine to route variable amounts of the initial biomass materials to the processes to obtain a mix of output products that provides an optimum profit.

20 Claims, 6 Drawing Sheets

(56) References Cited

U.S. PATENT DOCUMENTS

| | | |
|---|---|---|
| 5,419,381 A | 5/1995 | Fisher |
| 5,677,154 A * | 10/1997 | Van Draanen et al. ....... 435/163 |
| 6,099,288 A | 8/2000 | Long |
| 6,826,538 B1 | 11/2004 | Kalyan et al. |
| 7,117,164 B2 | 10/2006 | Slocum |
| 7,262,331 B2 | 8/2007 | van de Beld et al. |
| 7,552,095 B2 | 6/2009 | Kalyan |
| 7,908,164 B1 | 3/2011 | Verma et al. |
| 2005/0080520 A1 * | 4/2005 | Kline et al. ....................... 701/1 |
| 2005/0217134 A1 | 10/2005 | Lasonde |
| 2006/0036419 A1 * | 2/2006 | Cook et al. ..................... 703/11 |
| 2008/0172265 A1 | 7/2008 | Crane et al. |
| 2008/0197012 A1 * | 8/2008 | Berruti et al. ................... 201/31 |
| 2008/0288264 A1 | 11/2008 | Mach et al. |
| 2011/0010154 A1 * | 1/2011 | Cook et al. ..................... 703/11 |

OTHER PUBLICATIONS

Eckley, Donald E, "ABS: Alloy Blending System", Oct. 2004, Keystone System, Inc, pp. 1-10.*

Eckley, Donald E., "ABS: Alloy Blending System", Oct. 2004, Keystone System, Inc, pp. 1-10.*

Mani, S. Sokhansanj, X. Bi, A. Turhollow; "Economics of Producing Fuel Pellets From Biomass", Mar. 2006, Applied Engineering in Agriculture, vol. 22(3): pp. 421-426.*

Mani, S. et al., "Economics of Producing Fuel Pellets From Biomass", "Applied Engineering in Agriculture", Mar. 2006, pp. 421-426, vol. 22, No. 3.

* cited by examiner

METHOD AND APPARATUS FOR PROCESSING AGRICULTURAL MATERIALS AND CHANGING THE PROPORTIONS OF OUTPUT MATERIALS

CROSS-REFERENCE TO RELATED APPLICATIONS

This application is a divisional of U.S. patent application Ser. No. 11/837,493 titled "APPARATUS AND METHOD FOR PROCESSING AGRICULTURAL MATERIALS AND CHANGING THE PROPORTIONS OF OUTPUT MATERIALS" filed on Aug. 10, 2007 (which issued as U.S. Pat. No. 8,170,908 on May 1, 2012), which claims benefit of U.S. Provisional Patent Application No. 60/822,043 filed Aug. 10, 2006, titled "APPARATUS AND METHOD FOR PROCESSING AGRICULTURAL MATERIALS AND CHANGING THE PROPORTIONS OF OUTPUT MATERIALS," and U.S. Provisional Patent Application No. 60/824,523 filed Sep. 5, 2006, titled "METHOD AND APPARATUS FOR PROCESSING BIOMASS INTO ETHANOL AND PELLETS," each of which is incorporated herein by reference in its entirety including appendices.

FIELD OF THE INVENTION

This invention relates to the field of an apparatus and method for processing agricultural materials and changing the proportions of output materials, and more specifically the use of cellulosic materials to generate pellets, ethanol, lignin and the like.

BACKGROUND OF THE INVENTION

The use of renewable resources as an energy source in lieu of, for example, fossil fuels to provide an energy source is a use that is important to many modern economies. These renewable resources include solar power, wind power, and wave power just to name a few. A renewable energy resource that is currently in high demand is ethanol. Most U.S. ethanol plants use corn as the feedstock. While most economists and scientists agree that ethanol is a viable fuel alternative, ethanol derived from corn is not a preferred solution for a number of reasons such as the limited availability of corn and the need to use corn as food for humans and animals. Thus, for ethanol to become a viable option to replace fossil fuels, processes are needed that can produce ethanol from other inputs, specifically biomass.

Biomass is living or recently living biological material that can be used as fuel or processed to create other products. Some examples of biomass include wood chips and grasses. In addition to being a preferred feedstock for ethanol production, cellulosic biomass is also an attractive alternative to corn and other food grains for the stoves/furnaces that are used to generate energy in homes and businesses. Therefore, the production of biomass pellets is another important renewable energy process.

U.S. Pat. No. 5,215,135 (incorporated herein by reference), which issued to Coakley et al., describes a new type of fuel pellet cut directly from logs without grinding or extruding and a method and apparatus for manufacturing such fuel pellets. It does not provide additional alternative processes for making pellets or other products that could be selected from to achieve increased profitability.

U.S. Pat. No. 5,419,381 (incorporated herein by reference), which issued to Fisher, describes a peripheral-drive log lathe having no sliding surfaces susceptible to wear in either the log-pinching apparatus or in the knife assembly. The lathe is used to cut pellets from a log. It also does not provide additional alternative processes for making pellets, or for making other products.

U.S. Pat. No. 4,260,573 (incorporated herein by reference), which issued to Overman, describes a method and apparatus for forming pellets from wood particulate material: The apparatus comprises one or more parallel aligned, elongated dies formed by first and second aligned and mating continuous belts comprising a plurality of pads linked together. The wood particulate material, containing from 12 to 20% water, is cut, compacted, extruded and autogenously heated in the elongated dies by simultaneously rotating one of the belts counterclockwise and the other belt clockwise at respectively rotational speeds such that the linear speed of one of the belts is greater than the linear speed of the other. It does not provide additional alternative processes for making pellets or other products that could be selected from to achieve increased profitability.

U.S. Pat. No. 6,099,288 (incorporated herein by reference), which issued to Long, describes a pellet-forming apparatus for extruding high moisture materials in a low-pressure extrusion apparatus having an extruding cylinder and a cooperative extruding rotor. It also does not provide additional alternative processes for making pellets, or for making other products.

While the ability to make and use biomass is well known in the art, what is not well known is how to make and use biomass in such a manner that presently existing economic conditions can be taken into account. More to the point, what is needed is a method and apparatus for using economic data such as commodity prices of oil, electricity, and market conditions as a basis for determining whether to process biomass into biomass pellets, or to use the biomass in the production of ethanol, or to produce pellets, ethanol, and other products in some optimum proportion.

BRIEF SUMMARY OF THE INVENTION

In some embodiments, the present invention provides a process for maintaining the most profitable and efficient operating conditions for a biomass processing plant. In some embodiments, the plant uses two or more input feedstocks, and the plant generates two or more output products from each input. In some embodiments, the process takes in current economic data, for example, commodity prices, from a variety of sources. In some embodiments, the process uses the current economic data to determine the optimum operating conditions for the plant. In some embodiments, the process generates outputs based on the optimum operating conditions, for example, outputs that control valves within the plant so that certain proportions of products are generated.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Renewable Energy Manufacturing Processes

The cellulose found in biomass can be used in a number of different ways as a renewable energy source. In some embodiments, a process is used that breaks down the cellulose such that it can be used to generate ethanol ($C_2H_6O$—bioethanol), a combustible fuel that can be used in some internal combustion engines alone or in combination with other fuels (such as, for example, with gasoline). Ethanol's energy comes from the carbon-based feedstocks that get their energy from sunlight, water, and photosynthesis. Ethanol can be produced from a variety of feedstocks, such as sugar cane, miscanthus, sugar beet, sorghum, switchgrass, barley, hemp, kenaf, potatoes, sweet potatoes, cassava, sunflower, fruit, molasses, whey or skim milk, corn, corncobs, grain, wheat, wood, paper, straw, cotton, grain sorghum, barley, other biomass, as well as many types of cellulose waste.

In some embodiments, ethanol is generated using a hydrolysis process. Hydrolysis is a chemical reaction or process in which a molecule is split into two parts by reacting with a molecule of water. In biomass ethanol production, hydrolysis is used to break down cellulose molecules into sugars that can be fermented. Cellulose in nature usually occurs bound up with lignin, a complex polymer built largely of coniferyl (and related) alcohol subunits. Therefore, hydrolysis of biomass produces a combination of sugar molecules and residual material (i.e., lignin). After hydrolysis is completed, the sugar molecules are separated out from the residual material and fermented to create ethanol.

In some embodiments, a chemical hydrolysis process is performed by attacking the cellulose with an acid under high heat and high pressure. In other embodiments, an enzymatic hydrolysis process is performed by using a variety of enzymes to break down the cellulose. In some embodiments, enzymatic hydrolysis of biomass is performed by using the simultaneous saccharification and fermentation (SSF) process, which has recently been improved to include the cofermentation of multiple sugar substrates. In the SSF process, cellulase (a class of enzymes produced chiefly by fungi, bacteria, and protozoans that catalyze the cellulolysis (or hydrolysis of cellulose)) and fermenting microbes are combined. As sugars are produced by the cellulase, the fermentative organisms convert them to ethanol.

In some embodiments, the biomass feedstock is pretreated before it is hydrolyzed to make the biomass more amenable to hydrolysis. The pretreatment is needed because the lignin found in biomass is not attacked by the hydrolyzing agents, and the lignin effectively shields the cellulose portion. In some embodiments, the biomass is pretreated with severe chemical or physical treatments that either remove the lignin (e.g., by solvent extraction) or that drastically reduce the molecular order of the natural polymers (e.g., ball milling to a fine dust).

In some embodiments, the biomass feedstock is pretreated with gaseous ozone. The possible use of ozone is very attractive for a number of reasons. It does not leave strongly acidic, basic, or toxic residues in treated material. Since ozone is an unstable compound it can be decomposed back to oxygen by a simple catalyst bed so that residual ozone in any gaseous effluent can readily be removed. Thus, environmental problems, such as those associated with gaseous $SO_2$, for example, are avoided.

In some embodiments, the hydrolysis residual material is used as a fuel to generate energy in other parts of a biomass processing plant. In some embodiments, the hydrolysis residual material is pelletized by a pelletizing apparatus and the resulting pellets are stored in a storage container. In some embodiments, the hydrolysis residual material is stored in a lignin storage container.

In some embodiments, ethanol is made by the catalytic hydration of ethylene with sulfuric acid as the catalyst. This process is cheaper than the traditional fermentation associated with alcoholic beverages. It can also be obtained via ethylene or acetylene, from calcium carbide, coal, oil gas, and other sources. Petroleum derived ethanol (synthetic ethanol) is a widely used industrial solvent and has a considerable variety of other applications, including use as fuel additive.

In some embodiments, ethanol is generated by synthesis gas fermentation. Biomass is converted to synthesis gas (consisting primarily of carbon monoxide, carbon dioxide, and hydrogen) via a high temperature gasification process. After the gasification process is completed, anaerobic bacteria are used to convert the synthesis gas into ethanol.

In some embodiments, the ethanol produced by the biomass processing plant can be used as a fuel to generate energy in other parts of a biomass processing plant.

In some embodiments, the biomass feedstock used to generate ethanol can instead be pelletized by a pelletizing apparatus. The resulting pellets can then be stored in a storage container or they can be used as fuel for generating energy in other parts of a biomass processing plant. In some embodiments, the biomass feedstock can be used to produce both pellets and ethanol in proportions that allow a biomass processing plant to operate in the most efficient and profitable manner possible.

Economic Analysis Processes

In some embodiments a biomass processing plant uses two or more biomass feedstocks. For example, in some embodiments a biomass processing plant uses wood chips and switchgrass as possible feedstocks. In some embodiments, a biomass processing plant generates two or more output products from each input. For example, in some embodiments a biomass processing plant generates ethanol and cellulose pellets when using both wood chips and switchgrass as a feedstock.

In some embodiments, through harnessing modern computer technology and the ability to have access to the most recent information relating to market conditions, cellulose pellets or ethanol, generated as a product of biomass, can be produced in a manner that is cost effective and efficient. More to the point, in some embodiments, a process for operating a biomass processing plant (i.e., a biomass-data-analysis process ("BDAP")) that takes in market data in the form of, for example, commodity prices, price direction, futures prices, available call or put options, as well as plant characteristics, such as the availability of storage facilities for the raw input materials, intermediate products generated by one process and not yet used in a subsequent process, or the finished products and the availability of labor or skilled personnel to run the various processes. The process uses this input data, in combination with other market data, to determine whether it is more profitable or cost effective to use biomass to produce cellulose pellets or to instead use the biomass to make ethanol, or to use the biomass to make both cellulose pellets and ethanol in an optimum proportion.

In some embodiments, the data used to control the processes of the invention also include regulatory, pollution, and/or environmental data. For example, production of ethanol to be used for alcoholic beverages may require the payment of certain taxes (a price or cost to be taken into account when determining how much ethanol to produce), while production of ethanol to be used for fuel in internal-combustion engines may require the addition of gasoline to make that ethanol unsuitable for beverages (in order to qualify for avoiding the payment of beverage taxes), and/or carbon credits for sequestering carbon, and thus, in some embodiments, regulatory and/or tax data such as these are included in the input data to the calculations to determine the proportions of various possible output products to make. As another example, pollution considerations (e.g., an air-quality index, which may, in some embodiments, prohibit the plant from producing a product that would also produce a byproduct that exacerbates the air quality (e.g., perhaps delaying that production until a later time when the production would not be prohibited)), whether or not these are also regulatory or legal requirements, are used in the calculations to determine the proportions of various possible output products to make. In some embodiments, environmental and/or weather data (such as the ambient air temperature, which can affect the amount of energy needed to run the various processes, and thus contributes to the costs incurred and optimization desired), is used as inputs to the calculations.

In some embodiments, the "economic engine" (i.e., software and/or hardware that run in conjunction with a personal computer or other information processor) receives input data from a plurality of sources, normalizes and/or weights various portions of the input data (e.g., assigning various weights to costs of materials and labor, prices that may be obtained from selling various output products, the time value of money, opportunity costs, weather forecasts, the availability and locations of machinery to perform the processing relative to the availability and locations of raw materials and labor, and the like), and then generates output signals that control the various machinery that process the materials and/or outputs instructions, schedules, and/or authorizations to be acted upon by human operators (e.g., by sending text or synthesized voice commands to a cell phone or laptop computer of a person), and/or transmitting messages by internet, radio, or the like to order commodities or offer the outputs for sale. In some embodiments, feedback is continually obtained, and used to adjust the processes (by direct signals or by commands to a human operator). For example, as market prices change, the process is changed to vary the outputs that are being generated. In some embodiments, business conditions or relationships are also used as inputs to the economic engine to help control the process (e.g., if a particular client or customer is important to future business, providing product to that customer may be a factor to be considered, to ensure improved future business with that customer, even of other factors would not indicate a output-product mix that would allow providing that product to that customer).

In some embodiments, a do-loop or feedback loop is utilized to repeatedly obtain costs and prices, and iteratively vary the possible process variables and to compare the outcomes, until an optimal result is obtained (as determined by the desired results).

Figure 1:
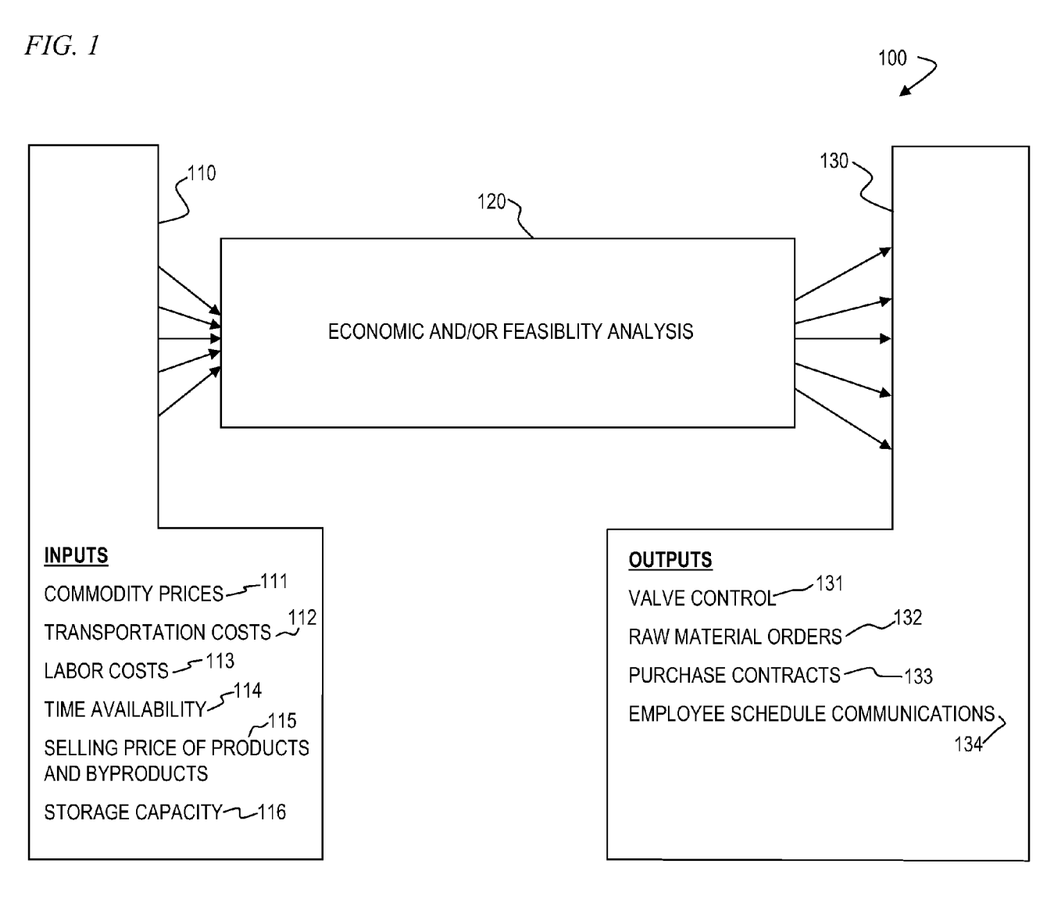
FIG. 1 is a block diagram of one embodiment of a process 100 used to control the operation of a biomass processing plant.

FIG. 1 depicts a biomass-data-analysis process 100 for operating a biomass processing plant. In some embodiments, one or more of the inputs 110 are taken in as variables and used by an economic analysis 120 that determines the outputs 130 (i.e., control signals or messages) needed to keep the plant operating at its most profitable and efficient level. In some embodiments, the inputs 110 include, for example, commodity prices 111, transportation costs 112, labor costs 113, time availability 114 (e.g., the time needed to produce products versus the time by which the products are needed, or how much longer will a particular process machine be needed for working on an existing process before it will be available for the next process), selling price of products and byproducts 115, and/or physical storage capacity 116 (e.g., containers for input materials, output materials, and/or intermediate byproducts). The outputs 130 include, for example, valve control 131 that controls flow of materials through the various plant processes, raw-material orders 132 (e.g., messages sent on the internet or by the postal mail to purchase raw materials for delivery to the plant at a given time and price), purchase contracts 133 (e.g., offers and acceptances for the plant's customers to purchase the output products of the plant), and employee-schedule communications 134 (e.g., automated telephone calls to employees at home to request them to come in or to elicit their availability to come in at a specific future time).

Figure 2:
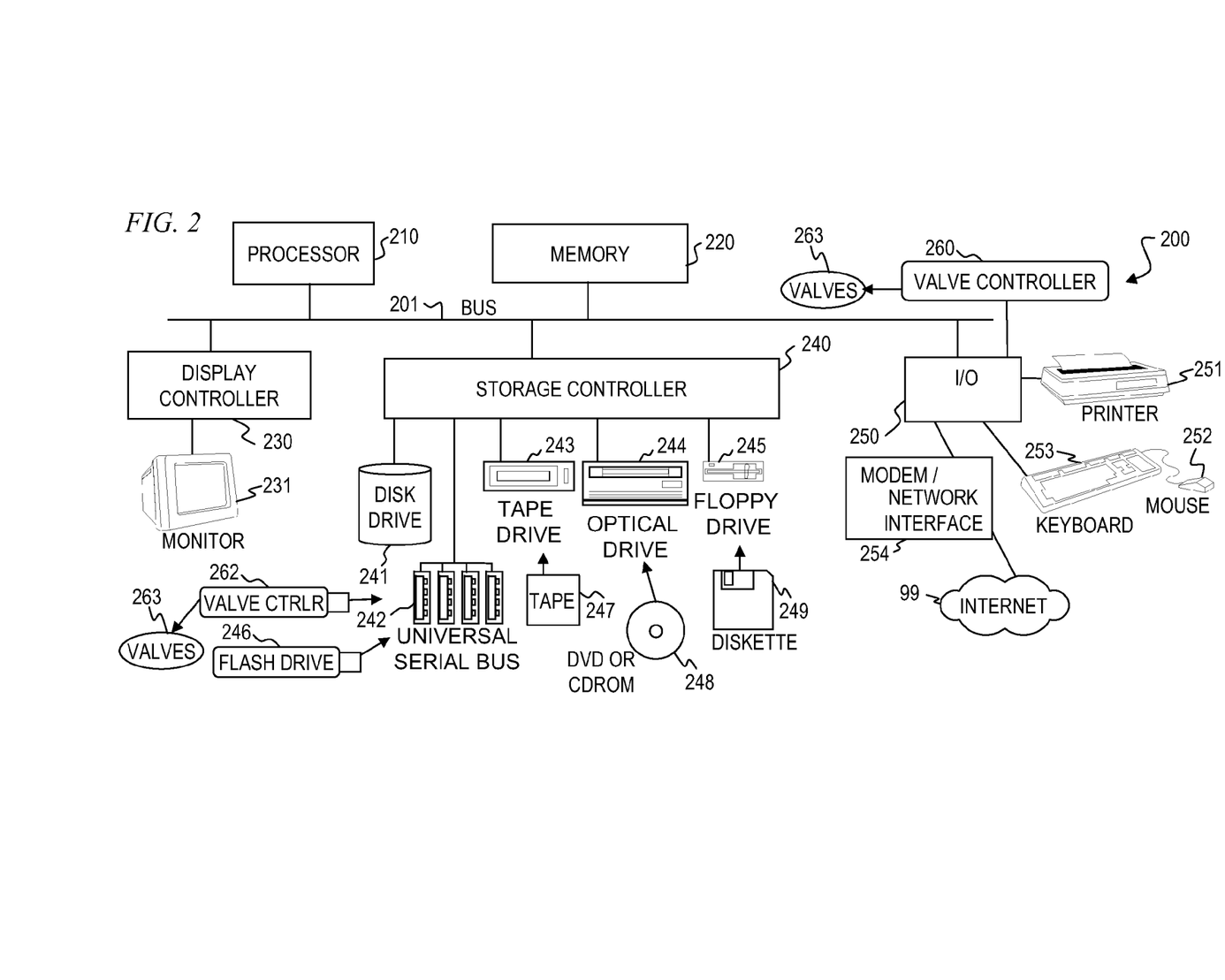
FIG. 2 is block diagram of one embodiment of an information processor 200 used in some embodiments to execute process 100, 300, and/or 400.

FIG. 2 is a block diagram of one embodiment of an information processor 200 used in some embodiments to execute process 100, 300, and/or 400. In some embodiments, the BDAP 100 is executed by a digital processing system or computer 200 that includes a processor 210, which may represent one or more processors each having one or more cores, and may include one or more conventional types of such processors (e.g., Athlon® 64, Opteron®, Sempron®, Pentium® 4, Pentium® D, or Efficeon™), such as are available from companies such as AMD, Intel, Transmeta or the like. In some embodiments, a memory 220 is coupled to the processor 210 by a bus 201. In some embodiments, memory 220 includes dynamic random access memory (DRAM) and/or static RAM (SRAM). In some embodiments, processor 210 may also be coupled to other types of memories (e.g., cache, FLASH memory, disk, etc.), which could be considered as part of the memory 220 or separate from the memory 220.

The bus 201 further couples the processor to a display controller 230 (for driving a visual display on monitor 231), a storage controller 240 (for reading and writing data from and to mass memory (e.g., disk drive(s) 241, Universal Serial Bus (USB) interfaces 242 for connecting to a variety of external devices such as flash drive 246, tape drive 243 that accepts tape cassette 247, optical drive 244 that accepts optical media such as DVDs or CDROMs 248, and/or floppy drive that accepts diskettes 249, and/or some other type of computer-readable media device), and an input/output (I/O) controller 250 that drives modem or network interface 254 for connecting to the internet 99, one or more keyboard 253 and mouse 252 and/or other trackball or other pointing devices, and/or printer 251 as well as scanners, digital cameras (e.g., used for machine vision processes to obtain information needed to control processes), microphones, and the like. In some embodiments, I/O controller 250 and/or USB interfaces 242 are used to interface to valve controllers 260 and/or 262, respectively, for controlling operation of valves 263 in the biomass processing plant. Computer-readable media 246, 247, 248, and/or 249 may include a magnetic, optical, magneto-optical, tape, and/or other type of machine-readable media/device for storing information.

In some embodiments, the present invention may be implemented entirely in executable computer program instructions that are stored on computer-readable media 246, 247, 248, and/or 249 or may be implemented in a combination of software and hardware, or in certain embodiments, entirely in hardware.

Embodiments within the scope of the present invention include computer-readable media for carrying or having computer-executable instructions or data structures stored thereon used to implement or control the processes described herein. Such computer-readable media may include any available medium, including storage accessed across the internet, that is accessible by a general-purpose or special-purpose computer system. When data processed by the BDAP 100 is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above are also be included within the scope of computer-readable media. Computer-executable or computer-readable instructions include, for example, instructions and data which cause a general-purpose computer system or special-purpose computer system to perform a certain function or group of functions. The computer-executable or computer-readable instructions may be, for example, binaries, intermediate format instructions such as assembly language, or even interpreted source code.

In this description and in the following claims, a computer system is defined as one or more software modules, one or more hardware modules, or combinations thereof, that work together to perform operations on electronic data and generate outputs. For example, the definition of computer system includes the hardware modules of a personal computer, as well as software modules, such as the operating system of the personal computer. A computer system may include one or more computers coupled via a network. Likewise, a computer system may include a single physical device (such as a mobile phone or Personal Digital Assistant "PDA") where internal modules (such as a processor and memory) work together to perform operations on electronic data.

Those skilled in the art will appreciate that the invention may be practiced in network computing environments with many types of computer-system configurations, including hubs, routers, wireless access points (WAPs), wireless stations, personal computers, laptop computers, hand-held devices, multi-processor systems, microprocessor-based or programmable consumer electronics, network PCs, mini-computers, mainframe computers, mobile telephones, PDAs, pagers, and the like. The invention can also be practiced in distributed-system environments where local and remote computer systems, which are linked (either by hardwired, wireless, or a combination of hardwired and wireless connections) through a network, such as but not limited to the internet, both perform tasks. In a distributed-system environment, program modules may be located in both local and remote memory-storage devices.

Ethanol and Fuel Pellets

As the U.S. looks to reduce its reliance on oil from around the world for fuel for our cars, the demand for ethanol is increasing. The process of making ethanol results in a bi-product or actually bi-products that can and is being used for several co-products, such as protein feed, gluten meal or soil amendment. Because most current US ethanol plants use feed corn as the primary input, corn sweeteners are also produced. While most economists and scientists agree that ethanol is a viable fuel alternative, ethanol derived from corn is not a feasible solution for a number of reasons. Thus, for ethanol to become a viable option for fuel for our vehicles we need processes that can produce ethanol from other inputs, specifically biomass (e.g., wood chips or grasses).

On the other side of the coin, the US can also reduce its reliance on energy from around the world by creating new ways to power our homes and businesses. Thus, there is a burgeoning market for stoves/furnaces that burn corn to generate energy. Much like the story above for ethanol-burning corn is not the answer. The answer is in producing pellets made from biomass.

Combining the Process to Make Fuel Ethanol and Fuel Pellets from Biomass

Clearly there is a market for alternative energy. While some may see ethanol and fuel pellets as competing for the available biomass resources, the inventors see an opportunity to combine the ethanol production process and pellet process into a single process whereby biomass is used to produce both fuel ethanol for vehicles and fuel pellets to power our homes and business, and describe a process that combines the production of ethanol with the production of fuel pellets.

Figure 3:
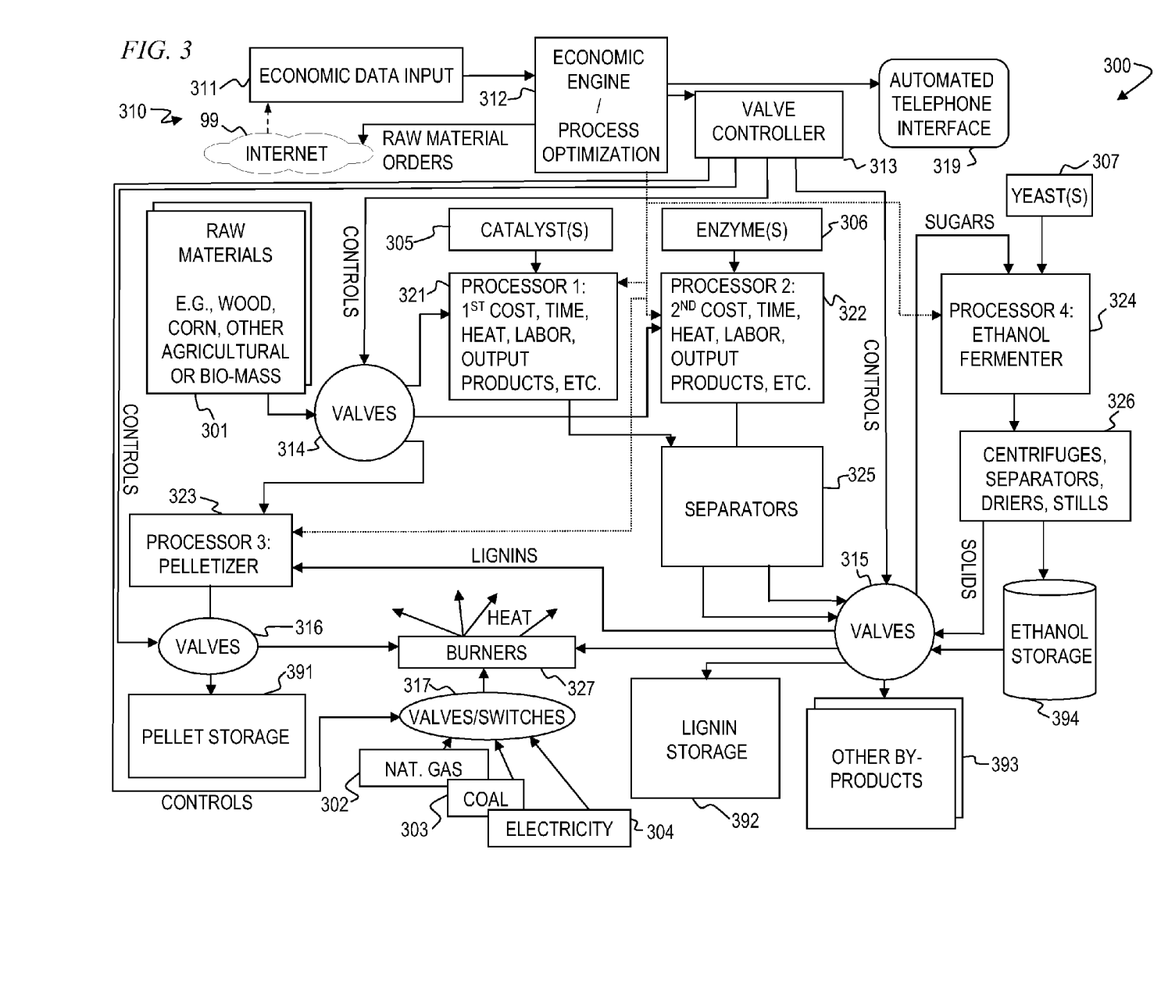
FIG. 3 is a schematic flow diagram of one embodiment of a process 300 used to control the operation of a biomass processing plant that manufactures ethanol and other products.

FIG. 3 is a block diagram of a biomass-processing plant 300 having an economic analysis and control system 310 used for controlling the various conditions of biomass-processing plant 300. In some embodiments, economic data input 311 (e.g., such as inputs 110 of FIG. 1) is taken in by the economic engine 312 (such as process 120 of FIG. 1 and/or software running on computer 200 of FIG. 2) and processed (e.g., calculating the cost of all possible products or certain combinations of products output from the plant from the cost and availability of raw materials, labor and energy, and comparing the short-term and/or long-term profitability) in order to determine the optimum operating conditions for the plant. After determining the optimum conditions, the economic engine 312 sends the appropriate output signal or message via valve controller 313 to the various valves 314, 315, 316, and valves/switches 317. For example, these output signals can tell valves 314 whether to send raw materials 301 to processor one 321, processor two 322, and/or processor three 323 and at what rates. Also, for example, these output signals can tell valves 315 whether lignin should be sent to lignin storage 392 or to burners 327 and at what rates. In addition, for example, these output signals can tell valves 316 whether to send the pellets from processor three 323 to pellet storage 391 or to burners 327 and at what rates. In some embodiments, the economic input data 311 is obtained through the internet 99, and in some embodiments, the economic engine 312 outputs the appropriate raw material order through the internet 99. In some embodiments, processor one 321 is a chemical hydrolysis process and therefore, in some embodiments, a catalyst 305 is added to processor one 321. In some embodiments, processor two 322 is an enzymatic hydrolysis process and therefore, in some embodiments, an enzyme 306 is added to processor two 322. In some embodiments, the economic engine 312 sends an appropriate output signal to an automated telephone interface 319 (e.g., a recorded or synthesized voice and an auto dialer used to telephone various employees, based on their skills and specialties and their wage rate, to request that they be at work at the plant to help monitor and/or control the various processes). For example, if the economic engine 312 determines that it is most efficient for the biomass processing plant 300 to use enzymatic hydrolysis, the economic engine 312 uses the automated telephone interface 319 to call up the necessary employees to operate processor two 322. In some embodiments, the outputs of processor one 321 and processor two 322 are sent to separators 325 so that the sugars can be separated from the residual material. In some embodiments, valves 315 send the sugars to processor four 324, which is used to ferment the sugars into ethanol. Yeast 307 is added to processor four 324 to ferment the sugars. In some embodiments, centrifuges, separators, driers, stills 326 are used to process the fermentation product coming from processor four 324. For example, a centrifuge can be used to separate the liquids from the solids, and then a still, for example, can be used to purify the ethanol. In some embodiments, ethanol is stored in ethanol storage 394. In some embodiments, the solids from centrifuges, separators, driers, stills 326 are sent by valves 315 to other by-products 393. For example, other by-products 393 can be used to process the solids into dried distiller's grains (DDG's), a common ethanol production by-product used to feed cattle. In some embodiments, burners 327 are used to generate energy for various locations throughout the biomass-processing plant 300. The fuel used for burners 327 can be, for example, fuel pellets, ethanol, natural gas 302, coal 303, or electricity 304. As part of the optimum condition calculation, the economic engine 312 determines which input for burners 327 is most economically feasible. For example, if economic engine 312 determines that the biomass processing plant 300 can make more money by selling ethanol and/or fuel pellets than by burning them as fuel, the economic engine 312 controls valves 315 and 316 and valves/switches 317, all via valve controller 313, such that valves 316 send any fuel pellets to pellet storage 391, valves 315 keep the ethanol in ethanol storage 394, and valves/switches 317 input the necessary energy source (i.e. natural gas 302, coal 303, or electricity 304). It is to be understood that the "valves" 314, 315, 316, and/to 317 can be implemented as electrical switches or process-signal generators as well as electric-mechanical valves, pneumatic or hydraulic controllers or any other control mechanism for the flow of materials or control of the process. As shown in the dotted lines from economic engine and process-optimization controller 312, control of the processes is one of the "outputs" that can be optimized based on the variable supplied to engine 312, and process monitoring variables (such as pressure, temperature, moisture content and the like) are measurements from the various processes that are obtained by appropriate sensors, and the resulting data is supplied to engine 312 as inputs to the optimization processes.

Figure 4:
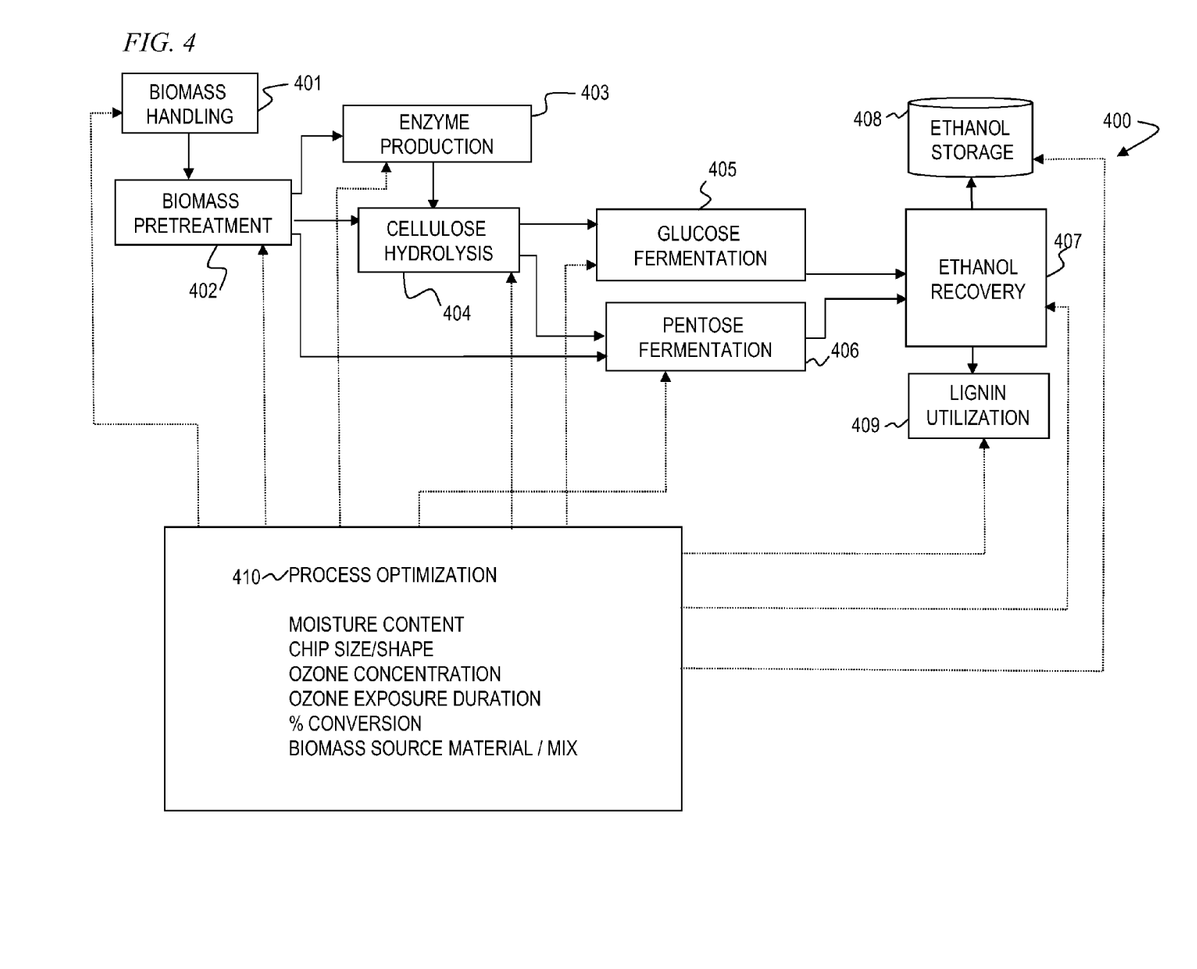
FIG. 4 is block diagram of one embodiment of a manufacturing process 400 used to generate ethanol.

FIG. 4 is a schematic of an ethanol production process 400. In some embodiments, the process 400 starts with biomass handling 401. For example, the biomass handling 401 can involve the transportation of the biomass to the ethanol plant and the subsequent loading of the biomass into the ethanol production process 400. In some embodiments, the handled biomass goes through biomass pretreatment 402. For example, the biomass can be pretreated with gaseous ozone so that the biomass is more amenable to hydrolysis. In some embodiments, the pretreated biomass is used in enzyme production 403 and the produced enzyme is then used in cellulose hydrolysis 404. In other embodiments, the pretreated biomass is used directly in cellulose hydrolysis 404. In still other embodiments, the pretreated biomass is used directly in pentose fermentation. The cellulose hydrolysis 404 breaks down the biomass into sugars and residual material. The sugars generated by cellulose hydrolysis 404 are fermented to produce ethanol. In some embodiments, the cellulose hydrolysis 404 produces glucose sugars and these glucose sugars undergo glucose fermentation 405. In other embodiments, the cellulose hydrolysis 404 produces pentose sugars and these pentose sugars undergo pentose fermentation 406. In some embodiments, the ethanol produced during fermentation is separated out from the other fermentation materials by ethanol recovery 407. For example, ethanol recovery 407 can include a separator that separates the solids from the liquids, and a still that purifies the ethanol. In some embodiments, the recovered ethanol is sent to ethanol storage 408, and the other fermentation materials go through lignin utilization 409. For example, the lignin found in the other fermentation materials can be used to form fuel pellets.

Figure 5:
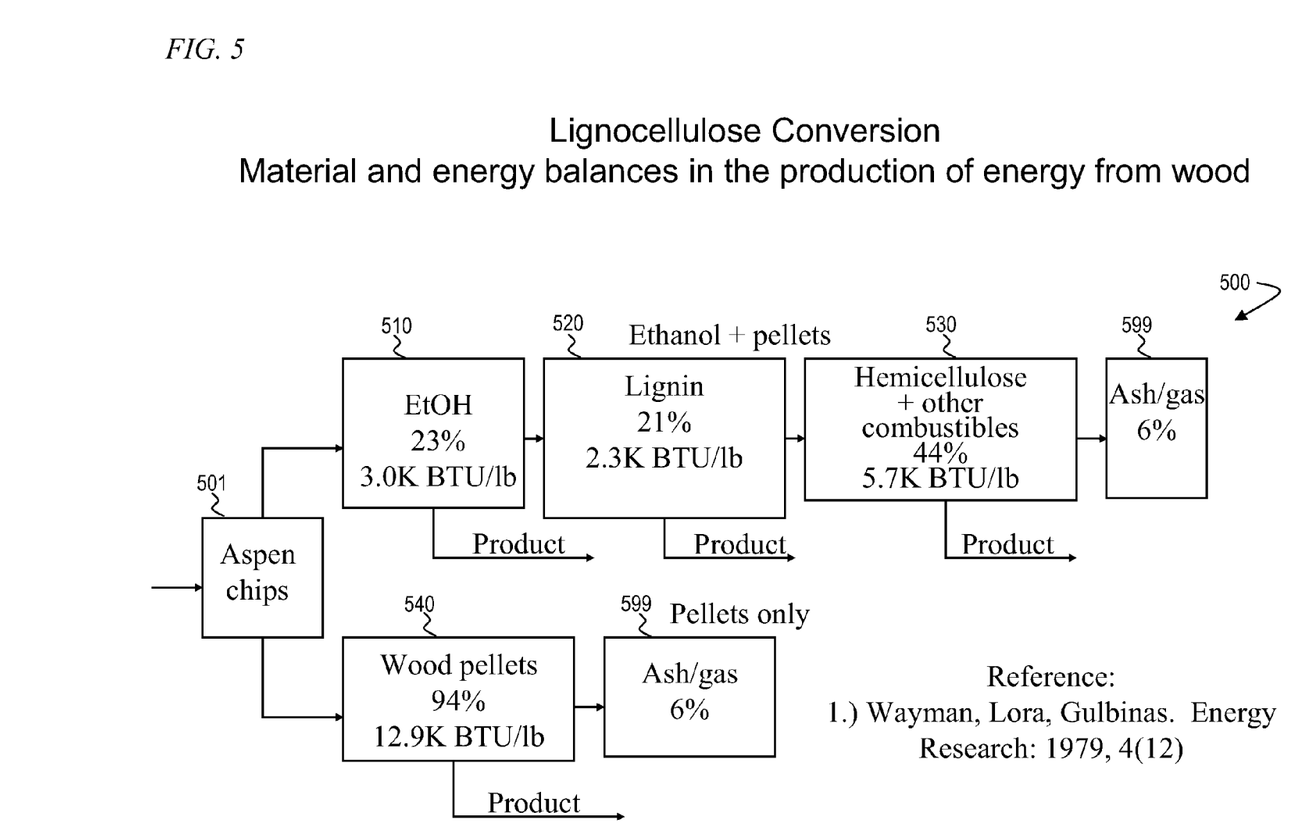
FIG. 5 is block diagram of one embodiment of a manufacturing process 500 used to generate ethanol and/or pellets.

FIG. 5 is block diagram of one embodiment of a manufacturing process 500 used to generate ethanol and/or pellets. If the input aspen chips 501 are used in the pelletizing process 540, the energy content of the resulting pellets is about 12,900 BTU/pound, with about 94% of the starting energy going to pellets and about 6% of the energy going to ash/gas 599, whereas if used to by ethanol process 510, lignin process 520, and hemicellulose process 530 to make ethanol and other products, the resulting ethanol obtains about 23% of the energy, or about 3000 BTU per pound, lignins obtain about 21% of the energy, or about 2300 BTU per pound, hemicellulose and other combustibles obtain about 44% of the energy, or about 5700 BTU per pound, and about 6% of the energy going to ash and/or gas 599.

Figure 6:
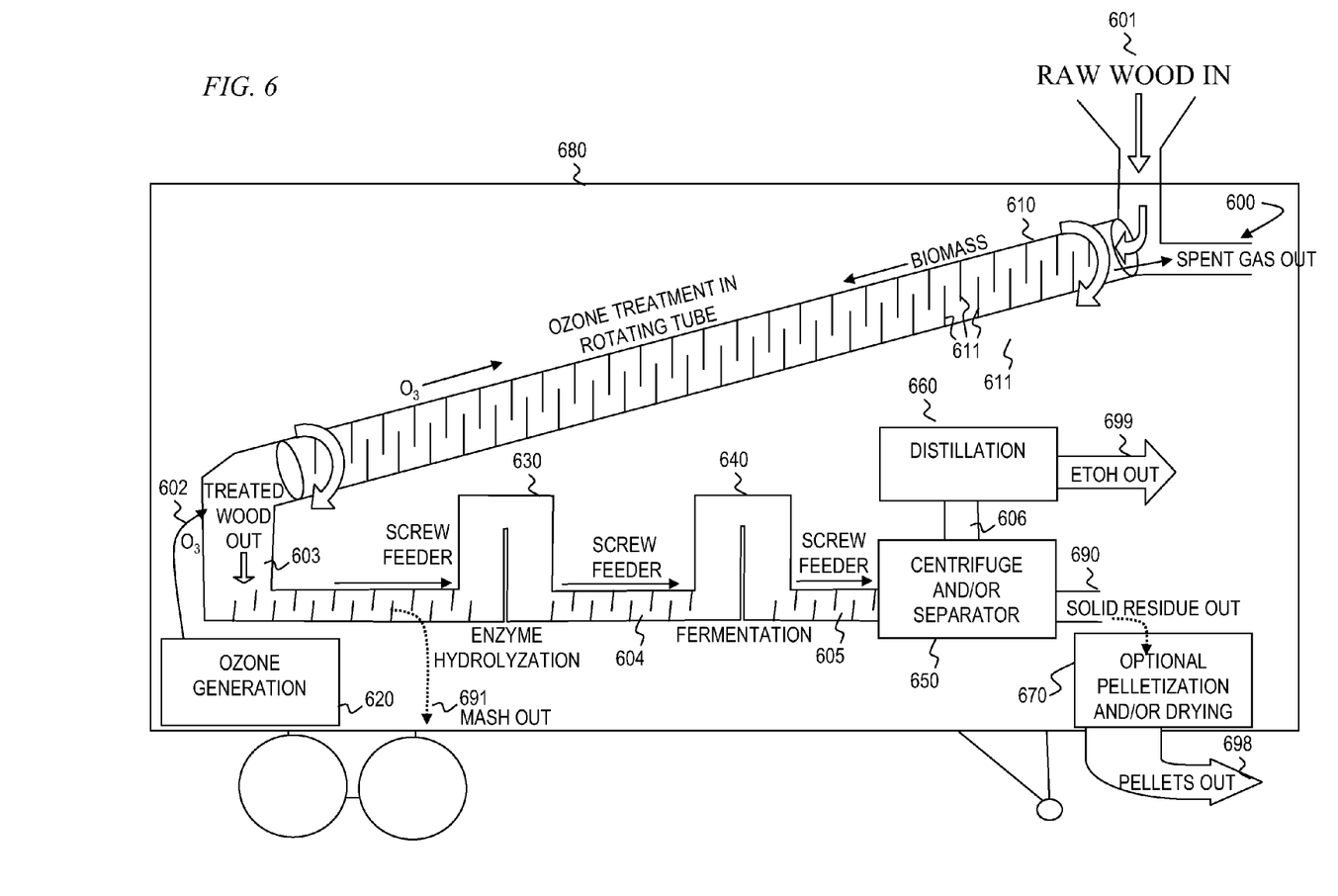
FIG. 6 is block diagram of one embodiment of a manufacturing process 600 used to generate ethanol and/or pellets.

FIG. 6 is block diagram of one embodiment of a manufacturing process and/or system 600 used to convert cellulosic biomass materials to generate ethanol and/or biomass (e.g., wood) byproducts, such as pellets. The various blocks shown in FIG. 6 refer to subsystems of a system 600 or to sub-processes of a process 600. In some embodiments, system 600 is incorporated into the invention of FIGS. 1-5, while in other embodiments, system 600 is a standalone system not necessarily using the optimizations between various possible output products as described above.

In some embodiments, biomass 601 enters a rotating tube 610 with vanes or fins 611 oriented to move the biomass material 601 through the tube 610 as the tube 610 turns. In some embodiments, the rate at which this tube 610 turns, the length of the tube 610, the diameter of the tube 610, and the construction, orientation and placement of the vanes 611 all determine the rate at which the biomass 611 is moved though the tube 610. In some embodiments, ozone gas 602 generated from oxygen or from the atmosphere (e.g., by ozone generator 620) is pumped through the tube 610 to react with the biomass 601 tumbling and moving through the tube 610. In some embodiments, the rate and method of biomass passage through the tube 610 controls the reaction rate of the ozone gas 602 with the biomass material 601. In some embodiments, the ozone-treated biomass is further treated in enzyme hydrolyzer 630. In some embodiments, at least a part of the biomass 601 is converted to sugars and carbohydrates that are easily digestible to bacteria to produce ethanol, or are easily digestible by livestock such as cattle, hogs, poultry, horses, emus, llamas, fish, shellfish, bees, or other domesticated or farm animals.

In some embodiments, the biomass-reaction rate is also determined by biomass material, particle size, quantity, surface area, moisture content, and ozone concentration.

In some embodiments, ozone gas pretreated biomass 603 leaves the tube 610 in a form more easily digestible to enzymes (in enzyme hydrolyzer 630) and/or yeast (in fermentor 640) to produce ethanol 699, and/or solids or mash 691 and/or 690 to feed to farm animals or to pelletize and dry for burning in wood-burning furnaces.

In some embodiments, for ethanol production, the ozone-pretreated biomass 603 is next entered into an enzyme hydrolysis process 630. For ethanol production, the ozone-pretreated and enzyme pretreated biomass 604 next enters a fermentation process 640. After fermentation, alcohol is distilled from liquids 606 separated from the fermented biomass 605. In some embodiments, the biomass 690 remaining after ozone or other pretreatment processes is then optionally dried (as with a screw, spinner or other drier) and then optionally pressed into fuel pellets 698 by pelletizer and drier 670 or processed into other products such as lignin.

In some embodiments, such a mobile system 600 capable of production both ethanol and pelletized fuel is built on a scale that fits onto one or more semi-trailers 680, which are moved to a "remote" location having sufficient biomass, and where the "remote" location makes it more economical to move the processing machinery to the biomass, rather than transporting the biomass to the machinery. In some embodiments, the economic engine obtains the locations and mass (amount of material) of the available biomass, the costs for moving the biomass various distances and determines one or more optimal locations to which to move the mobile system 600, in order to maximize profit and/or meet other constraints, taking into consideration the locations, masses, and costs to move the raw materials, intermediate products, and/or output products.

In some embodiments, system 600 includes one or more pre-processing processes or operations that reduce the amount of biomass and/or create certain relatively valuable (by weight, volume, need, marketability or the like) intermediate products, which are then transported to one or more different final processing plants. In some embodiments, one or more of the final processing plants is also a mobile processing system 600, which in turn is located at some central location determined by the economic engine to provide some economic or logistical advantage (such as the cost and availability/location of different types of mobile processing systems 600, the availability of labor to transport the mobile processing systems 600, the cost and ability/distance to transport various raw materials to staging areas for preprocessing, the cost and ability/distance to transport various intermediate or partially processed materials from the staging areas to other processing locations (at which there are other mobile processing systems 600) for further processing). These factors are thus included in the overall optimization and feasibility calculations of the economic engine 312.

For example, in some embodiments, different raw materials may require different preprocessing, and each may generate different intermediate products. Thus, the economic engine 312 would direct movement of the appropriate mobile systems 600, each capable of performing one or more different preprocessing operations, and each generating, for example one or more sugars or concentrated sugar-filled liquids useful for ethanol production, to the several different locations of the raw materials (such as switch grass, aspen chips, and the like). In some embodiments, some of the raw biomass is transported and aggregated at a number of collecting stations to which the preprocessing systems 600 are moved. These preprocessing mobile systems 600 process the various raw materials, and generate concentrated sugar-filled liquids, which are then moved to other centralized locations under the direction of the economic engine, and other final-processing mobile systems 600 would do further or final processing to produce the output products.

As an example, say a preprocessing mobile system 600 is initially at location X=0, Y=0 miles, and there are 450 metric tons of switchgrass at a location X=25, Y=10 miles, 300 metric tons of switchgrass at a location X=15, Y=30, and 100 metric tons of switchgrass at X=20, Y=10 miles. In some embodiments, it makes more economic sense to drive the preprocessing mobile system 600 to the third site, then the first site, and then to the second site. Other factors being equal, the economic engine 312 would then output an indication of scheduling the preprocessing mobile system 600 to travel to site three, site one, and then site two. However other factors, such as weather at the various sites, the different costs of trucks at different times to transport the partially processed materials (e.g., sugars) to the next mobile processing system 600 (e.g., for final processing to ethanol), the current and future planned locations of the next mobile processing system 600, and other factors may be taken into effect and determine a different travel route or schedule for the preprocessing mobile system 600 to travel and operate at site three, site one, and site two. In some embodiments, economic engine 312 sends internet-based messages, or text messages to the cell phones of the driver/operator of preprocessing mobile system 600, providing directions (e.g., GPS coordinates), schedules and itineraries to a plurality of driver/operators (e.g., to their cell phones or to computers mounted to their semi rigs used to transport the preprocessing mobile system 600. In some embodiments, such messages are also sent in a similar manner to farmers telling them the schedule for processing their commodities. In some embodiments, the economic data input to economic engine 312 includes offers (e.g., specifying type of raw material, its location, amount and price) of various commodities by farmers received in response to internet-connected browser screens and/or web sites that elicit such information.

In some embodiments, such a mobile system 600 on a transport platform 680 (such as a semi trailer), built small enough, can be easily moved to and located at individual farms and other businesses.

In some embodiments, such a small-scale system 600 is built to fit into a shipping container such as are used for oceanic transport, in order to be optionally affixed to a wheeled trailer undercarriage to be transported by a semi-trailer tractor and/or used on a semi-trailer 680.

In some embodiments, such a small-scale system 600, including ozone pretreatment, is more environmentally clean and harmless compared to other methods.

In some embodiments, such a small-scale system 600 can be delivered to and placed in "every" farmers barn and in every farmer's field. Such a system can also be scaled up for use as a factory at a centralized location.

In some embodiments, such a small-scale system 600 can generate fuel and electricity for a largely distributed energy grid.

In some embodiments, system 600 will generate 65 to 80 gallons of ethanol per ton of wood (i.e., generate about 270 to 333 liters of alcohol per metric ton (megagram) wood). In some embodiments, the amount of ozone used to treat the wood is about 3% of the wood mass, which is 60 pounds of ozone per ton of wood mass (30 kilogram ozone/metric ton wood). In some embodiments, an optimum contact time of ozone and wood is about 3 hours (180 minutes), which means about 8 loads of wood can be processed per day ((24 hours per day) divided by (3 hours per load)=8 loads). If one ton of wood is processed per day, then each load will be about 2000 pounds divided by 8 loads=250 pounds per load. (Although the feed is continuous, these numbers establish the feed rate and tube dimensions of some embodiments.) Thus, an eightinch-diameter tube has bins of about ⅙ cubic foot of wood per linear foot of tube. In some embodiments, the vanes are about one radius high and have a spacing of 6 inches; so the 250-pound load of wood requires about 42 bins in a rotating-reaction tumbler-tube length of 21 feet (i.e., in some embodiments, tube 610 of FIG. 6 is about 21 feet long and 8 inches in diameter).

In some embodiments, the present invention provides a method that includes obtaining economic data relating to costs of initial biomass materials and prices that would be paid for a plurality of output products derived from the raw materials; performing one or more calculations to determine an optimum amount of each of the plurality of output products; and controlling a plurality of processes that generate the plurality of output products from the raw materials based, at least in part, on the one or more calculations.

Some embodiments of this method further include obtaining data that indicate an amount of storage available for one or more of the output products, wherein the controlling further includes basing the controlling, at least in part, on the data that indicate the amount of storage available for one or more of the output products.

In some embodiments of the method, the calculations to determine an optimum amount of each of the plurality of output products are based, at least in part, on relative costs of different initial biomass materials.

In some embodiments of the method, the calculations to determine an optimum amount of each of the plurality of output products are based, at least in part, on relative costs of energy purchased from a third party versus energy derived from combusting one or more products obtained from the plurality of processes.

In some embodiments of the method, the plurality of output products include ethanol and pelletized biomass material, and wherein the calculations determine a proportion of ethanol and a proportion of pelletized biomass material that maximize a profit.

Some embodiments of this method further include obtaining data that indicate an availability of labor required to perform one or more of the plurality of processes, wherein the controlling further includes basing the controlling, at least in part, on the data that indicate the availability of labor required to perform one or more of the plurality of processes.

Some embodiments of this method further include providing a biomass processor on a mobile platform; and performing the method, at least partially, in the biomass processor on the mobile platform.

In some embodiments, the present invention provides a computer-readable medium (e.g., optical medium 248 or storage systems accessed by internet 99; see FIG. 2) having instructions stored thereon for causing a suitably programmed information-processing system to perform one or more of the methods described herein.

In some embodiments, the present invention provides a system that includes a biomass processor that converts initial biomass materials into one or more output products; an economic engine that obtains economic data relating to costs of initial biomass materials and prices that would be paid for a plurality of output products derived from the raw materials, and performs one or more calculations to determine an optimum amount of each of the plurality of output products; and one or more valves that are operatively coupled to the biomass processor and that are controlled by the economic engine to route variable amounts of the initial biomass materials through the biomass processor to obtain a mix of output products that provides an optimum profit.

In some embodiments of the system, the economic engine obtains data that indicate an amount of storage available for one or more of the output products, and wherein the one or more valves are controlled, at least in part, on the data that indicate the amount of storage available for one or more of the output products.

In some embodiments of the system, the calculations performed by the economic engine to determine an optimum amount of each of the plurality of output products are based, at least in part, on relative costs of different initial biomass materials.

In some embodiments of the system, the calculations performed by the economic engine to determine an optimum amount of each of the plurality of output products are based, at least in part, on relative costs of energy purchased from a third party versus energy derived from combusting one or more products obtained from the biomass processor.

In some embodiments of the system, the plurality of output products include ethanol and pelletized biomass material, and wherein the calculations determine a proportion of ethanol and a proportion of pelletized biomass material that maximize a profit.

In some embodiments of the system, the economic engine obtains data that indicate an availability of labor required to operate the biomass processor, wherein the one or more valves are controlled, at least in part, on the data that indicate the availability of labor required to perform one or more of the plurality of processes.

Some embodiments of the system further include a mobile platform, wherein the biomass processor is mounted, at least in part, on the mobile platform during its operation to produce the output products.

In some embodiments, the present invention provides an apparatus that includes a receiver operative to obtain economic data relating to costs of initial biomass materials and prices that would be paid for a plurality of output products derived from the raw materials; means for calculating operative to determine an optimum amount of each of the plurality of output products; and means for controlling a plurality of processes that generate the plurality of output products from the raw materials based, at least in part, on the one or more calculations.

In some embodiments of the apparatus, the means for calculating obtains data that indicate an amount of storage available for one or more of the output products, and wherein the means for controlling further includes basing the controlling, at least in part, on the data that indicate the amount of storage available for one or more of the output products.

In some embodiments of the apparatus, the means for calculating determine an optimum amount of each of the plurality of output products are based, at least in part, on relative costs of different initial biomass materials.

In some embodiments of the apparatus, the means for calculating determine an optimum amount of each of the plurality of output products are based, at least in part, on relative costs of energy purchased from a third party versus energy derived from combusting one or more products obtained from the plurality of processes.

In some embodiments of the apparatus, the plurality of output products include ethanol and pelletized biomass material, and wherein the calculations determine a proportion of ethanol and a proportion of pelletized biomass material that maximize a profit.

In some embodiments of the apparatus, the means for calculating obtains data that indicate an availability of labor required to perform one or more of the plurality of processes, and wherein the means for controlling further includes basing the controlling, at least in part, on the data that indicate the availability of labor required to perform one or more of the plurality of processes.

In some embodiments, the economic engine and/or process uses an algorithm to iteratively and/or continually optimize the times and quantities to provide the desired outcomes. In some embodiments, feedback data from the process itself is used to adjust the process to bring the output production into compliance with the optimized mix of products produced. In some embodiments, input data from outside the process is repeatedly sampled at predetermined intervals, and the process is varied to adjust the optimal mix of products produced.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method performed by a computer system comprising:
   obtaining, by the computer system, economic data relating to costs of a plurality of different initial agricultural cellulosic biomass materials;
   obtaining, by the computer system, economic data relating to prices that would be paid for a plurality of output products that are not found in, but that are derived from: the initial agricultural cellulosic biomass materials;
   performing calculations by the computer system based on the obtained economic data relating to costs and the obtained economic data relating to prices in order to determine an optimum amount, for maximum profit, of each of the plurality of output products that are not found in the initial biomass materials; and
   controlling, by the computer system, a plurality of biomass-conversion machinery processes that generate the plurality of output products from the initial biomass materials based on the calculations, wherein the plurality of biomass-conversion machinery processes include a control mechanism that controls a flow of materials through the plurality of biomass-conversion machinery processes.

2. The method of claim 1, further comprising:
   obtaining, by the computer system, data that indicate an amount of storage available for the plurality of output products, wherein the controlling further includes controlling the plurality of industrial processes with the computer system based on the data that indicate the amount of storage available for the plurality of output products.

3. A method comprising:
   obtaining economic data relating to costs of a plurality of different initial agricultural cellulosic biomass materials and prices that would be paid for a plurality of output products that are not found in, but that are derived from, the initial agricultural cellulosic biomass materials;
   performing one or more calculations to determine an optimum amount of each of the plurality of output products that are not found in the initial agricultural cellulosic biomass materials;
   controlling a plurality of biomass-conversion machinery processes that generate the plurality of output products from the initial agricultural cellulosic biomass materials based, at least in part, on the one or more calculations, wherein the plurality of biomass-conversion machinery processes include a control mechanism that controls a flow of materials through the plurality of biomass-conversion machinery processes;
   providing a first mobile processing system;
   transporting the first mobile processing system to each of a plurality of different locations including a first location and a second location, wherein the first location has a first one of the plurality of different initial agricultural cellulosic biomass materials, and wherein the second location has a second one of the plurality of different initial agricultural cellulosic biomass materials;
   at the first location, processing, by the first mobile processing system, the first one of the plurality of initial agricultural cellulosic biomass materials into a first intermediate product;
   at the second location, processing, by the first mobile processing system, the second one of the plurality of initial agricultural cellulosic biomass materials into a second intermediate product;
   transporting the first and second intermediate products to a centralized location; and
   at the centralized location, processing the first and second intermediate products into the optimum amount of each of the plurality of output products as determined by the performing of the calculations.

4. The method of claim 3, further comprising:
   determining an optimal route for the first mobile processing system to travel between the plurality of different locations of the plurality of different initial agricultural cellulosic biomass materials.

5. The method of claim 3, wherein the first intermediate product is a first sugar-filled liquid, wherein the second intermediate product is a second sugar-filled liquid, and wherein the plurality of output products includes ethanol.

6. The method of claim 5, wherein the plurality of output products include both ethanol and pelletized fuel, and wherein the processing of the first one of the plurality of initial agricultural cellulosic biomass materials includes enzymatic hydrolysis of cellulose.

7. The method of claim 3, wherein the processing at the centralized location is performed using a second mobile processing system.

8. A method comprising:
   obtaining economic data relating to costs of a plurality of different initial agricultural cellulosic biomass materials and prices that would be paid for a plurality of output products that are not found in the initial agricultural cellulosic biomass materials, but that are derived from the initial agricultural cellulosic biomass materials;
   performing one or more calculations to determine an optimum amount of each of the plurality of output products that are not found in the initial agricultural cellulosic biomass materials;
   providing a first mobile processing system;
   transporting the first mobile processing system to each of a plurality of different locations of the plurality of different initial agricultural cellulosic biomass materials;

generating machinery-control signals and changing the signals for controlling a plurality of biomass-conversion machinery processes in the first mobile processing system that generate the plurality of output products from the initial agricultural cellulosic biomass materials based, at least in part, on the one or more calculations, wherein the plurality of biomass-conversion machinery processes include a control mechanism that controls a flow of materials through the plurality of biomass-conversion machinery processes; and at each of the plurality of different locations, performing, by the first mobile processing system, simultaneous saccharification and fermentation of cellulose.

9. A mobile apparatus to process agricultural cellulosic biomass materials into a plurality of marketable output products, the mobile apparatus comprising:

means for receiving economic data relating to costs of initial agricultural cellulosic biomass materials and prices that would be paid for the plurality of output products that are not found in the initial agricultural cellulosic biomass materials, but that are derived from, the initial agricultural cellulosic biomass materials;

means for calculating operative to determine an optimum amount of each of the plurality of output products that are not found in the initial agricultural cellulosic biomass materials based on the economic data from the means for receiving; and means for controlling a plurality of biomass-conversion industrial processes that generate the plurality of output products from the initial agricultural cellulosic biomass materials based, at least in part, on calculations of the means for calculating; and a first mobile industrial processing system that includes:
a first wheeled transport platform, and
a first means for converting biomass mounted on the first wheeled transport platform, wherein the first means for converting biomass is configured to process each of a plurality of different initial agricultural cellulosic biomass materials into each of the plurality of output products, wherein the means for controlling is operatively coupled to control operation of the first means for converting biomass, wherein the plurality of industrial processes controlled by the means for controlling include the first means for converting biomass.

10. The apparatus of claim 9, wherein the means for calculating obtains data that indicate an amount of storage available for one or more of the output products, and wherein the means for controlling further includes basing the controlling, at least in part, on the data that indicate the amount of storage available for one or more of the output products.

11. The apparatus of claim 9, wherein the means for calculating determine an optimum amount of each of the plurality of output products are based, at least in part, on relative costs of different initial agricultural cellulosic biomass materials.

12. A mobile apparatus to process agricultural cellulosic biomass materials into a plurality of marketable products, the mobile apparatus comprising:

means for receiving economic data relating to costs of initial agricultural cellulosic biomass materials and prices that would be paid for a plurality of output products that are not found in the initial agricultural cellulosic biomass materials, but that are derived from, the initial agricultural cellulosic biomass materials;

means for calculating operative to determine an optimum amount of each of the plurality of output products that are not found in the initial agricultural cellulosic biomass materials based on the economic data from the means for receiving; and means for controlling a plurality of biomass-conversion processes that generate the plurality of output products from the raw materials based, at least in part, on calculations of the means for calculating;

a first mobile processing system that includes:
a first wheeled transport platform, and
a first means for converting biomass mounted on the first wheeled transport platform, wherein the first means for converting biomass is configured to process each of a plurality of different initial agricultural cellulosic biomass materials into each of a plurality of different output products, wherein the means for controlling is operatively coupled to control operation of the first means for converting biomass;

means for transporting the first mobile processing system to each of a plurality of different locations of the plurality of different initial agricultural cellulosic biomass materials;

wherein the first means for converting biomass processes, at each of the plurality of different locations, at least one of the plurality of initial agricultural cellulosic biomass materials into at least one produced sugar-filled liquid useful for ethanol production;

means for moving the produced at least one sugar-filled liquid to a centralized location; and at the centralized location, means for processing the at least one produced sugar-filled liquid into a plurality of output products including ethanol.

13. The apparatus of claim 12, wherein the means for processing includes a second mobile processing system located at the centralized location.

14. A mobile apparatus to process agricultural cellulosic biomass materials into a plurality of marketable products, the mobile apparatus comprising:

means for receiving economic data relating to costs of initial agricultural cellulosic biomass materials and prices that would be paid for a plurality of output products that are not found in the initial agricultural cellulosic biomass materials, but that are derived from, the initial agricultural cellulosic biomass materials;

means for calculating operative to determine an optimum amount of each of the plurality of output products that are not found in the initial agricultural cellulosic biomass materials based on the economic data from the means for receiving;

means for controlling a plurality of biomass-conversion processes that generate the plurality of output products from the raw materials based, at least in part, on calculations of the means for calculating; and a first mobile system that includes:
a first wheeled transport platform, and
a first means for converting biomass mounted on the first wheeled transport platform, wherein the first means for converting biomass is configured to process each of a plurality of different initial agricultural cellulosic biomass materials into each of a plurality of different output products, wherein the means for controlling is operatively coupled to control operation of the first means for converting biomass, wherein the first means for converting biomass includes means for performing simultaneous saccharification and fermentation of cellulose.

15. A mobile apparatus to process agricultural cellulosic biomass materials into a plurality of marketable products, the mobile apparatus comprising:
- means for receiving economic data relating to costs of initial agricultural cellulosic biomass materials and prices that would be paid for a plurality of output products that are not found in the initial agricultural cellulosic biomass materials, but that are derived from, the initial agricultural cellulosic biomass materials;
- means for calculating operative to determine an optimum amount of each of the plurality of output products that are not found in the initial agricultural cellulosic biomass materials based on the economic data from the means for receiving;
- means for controlling a plurality of biomass-conversion processes that generate the plurality of output products from the raw materials based, at least in part, on calculations of the means for calculating; and
- a first mobile system that includes:
  - a first wheeled transport platform, and
  - a first means for converting biomass mounted on the first wheeled transport platform, wherein the first means for converting biomass is configured to process each of a plurality of different initial agricultural cellulosic biomass materials into each of a plurality of different output products, wherein the means for controlling is operatively coupled to control operation of the first means for converting biomass, wherein the first means for converting biomass includes means for performing enzymatic hydrolysis of cellulose.

16. An apparatus to process agricultural cellulosic biomass materials into a plurality of marketable products, the apparatus comprising:
- a first mobile system that includes:
  - a first wheeled transport platform, and a first biomass-conversion system mounted on the first wheeled transport platform, wherein the first biomass-conversion system is configured to perform a plurality of biomass-conversion machine processes that process a plurality of different initial agricultural cellulosic biomass materials into variable amounts of each of a first plurality of different output products, wherein the first plurality of different output products is not found in the plurality of different initial agricultural cellulosic biomass materials, wherein the plurality of biomass-conversion machine processes include a control mechanism that controls a flow of materials through the plurality of biomass-conversion machine processes;
- an economic engine configured to process economic data relating to costs of a plurality of different initial agricultural cellulosic biomass materials and prices that would be paid for a plurality of output products derived from the initial agricultural cellulosic biomass materials and to perform calculations to determine a first set of optimum amounts of each of the first plurality of output products; and
- a first controller operatively coupled to control the variable amounts from the plurality of biomass-conversion machine processes of the first biomass-conversion system to generate the first set of optimum amounts of each of the first plurality of output products as determined by the economic engine.

17. The apparatus of claim 16, further comprising a second mobile system that includes:
- a second wheeled transport platform;
- a second biomass-conversion system mounted on the second wheeled transport platform, wherein the second biomass-conversion system is configured to process each of the first plurality of different output products from the first mobile system into each of a second plurality of different output products; and
- a second controller operatively coupled to control the second biomass-conversion system to generate a different optimum amount of each of the plurality of output products as determined by the economic engine.

18. An apparatus to process agricultural cellulosic biomass materials into a plurality of marketable products, the apparatus comprising:
- a first mobile system that includes:
- a first wheeled transport platform, and a first biomass-conversion system mounted on the first wheeled transport platform, wherein the first biomass-conversion system is configured to process each of a plurality of different initial agricultural cellulosic biomass materials into each of a first plurality of different output products, wherein the first plurality of different output products is not found in the plurality of different initial agricultural cellulosic biomass materials, wherein the first biomass-conversion system includes a first control mechanism that controls a flow of materials through the first biomass-conversion system;
- a second mobile system that includes:
- a second wheeled transport platform; and
- a second biomass-conversion system mounted on the second wheeled transport platform, wherein the second biomass-conversion system is configured to process each of the first plurality of different output products from the first mobile system into each of a second plurality of different output products;
- an economic engine operatively coupled to the first mobile system and configured to process economic data and to perform calculations to determine a first set of optimum amounts of each of the plurality of output products;
- wherein the first biomass-conversion system is configured to perform enzymatic hydrolysis of cellulose, and wherein the second biomass-conversion system is configured to produce ethanol from intermediate products from the enzymatic hydrolysis of cellulose.

19. An apparatus to process agricultural cellulosic biomass materials into a plurality of marketable products, the apparatus comprising:
- a first mobile system that includes:
- a first wheeled transport platform, and a first biomass-conversion system mounted on the first wheeled transport platform, wherein the first biomass-conversion system is configured to process each of a plurality of different initial agricultural cellulosic biomass materials into each of a first plurality of different output products, wherein the first plurality of different output products is not found in the plurality of different initial agricultural cellulosic biomass materials, wherein the first biomass-conversion system includes a control mechanism that controls a flow of materials through the first biomass-conversion system, and wherein the first biomass-conversion system is configured to perform enzymatic hydrolysis of cellulose; and
- an economic engine operatively coupled to the first mobile system and configured to process economic data and to perform calculations to determine a first set of optimum amounts of each of the plurality of output products.

20. An apparatus to process agricultural cellulosic biomass materials into a plurality of marketable products, the apparatus comprising:
- a first mobile system that includes:
- a first wheeled transport platform, and a first biomass-conversion system mounted on the first wheeled transport platform, wherein the first biomass-conversion system is configured to process each of a plurality of different initial agricultural cellulosic biomass materials into each of a first plurality of different output products, wherein the first plurality of different output products is not found in the plurality of different initial agricultural cellulosic biomass materials, wherein the first biomass-conversion system includes a control mechanism that controls a flow of materials through the first biomass-conversion system, and wherein first biomass-conversion system is configured to perform simultaneous saccharification and fermentation of cellulose; and an economic engine operatively coupled to the first mobile system and configured to process economic data and to perform calculations to determine a first set of optimum amounts of each of the plurality of output products.

* * * * *